(12) United States Patent
Sakemi et al.

(10) Patent No.: US 10,425,227 B2
(45) Date of Patent: Sep. 24, 2019

(54) COMPUTER-READABLE RECORDING MEDIUM, SHARED KEY GENERATION METHOD, AND INFORMATION PROCESSING TERMINAL

(71) Applicant: FUJITSU LIMITED, Kawasaki-shi, Kanagawa (JP)

(72) Inventors: Yumi Sakemi, Kawasaki (JP); Ikuya Morikawa, Kawasaki (JP); Masahiko Takenaka, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 342 days.

(21) Appl. No.: 15/385,538

(22) Filed: Dec. 20, 2016

(65) Prior Publication Data

US 2017/0207914 A1    Jul. 20, 2017

(30) Foreign Application Priority Data

Jan. 15, 2016    (JP) .................................. 2016-006688

(51) Int. Cl.
*H04L 29/06*    (2006.01)
*H04L 9/08*    (2006.01)
(Continued)

(52) U.S. Cl.
CPC .......... *H04L 9/0861* (2013.01); *H04L 9/0847* (2013.01); *H04L 9/14* (2013.01); *H04L 9/3073* (2013.01)

(58) Field of Classification Search
CPC ....... H04L 9/0861; H04L 9/3073; H04L 9/14; H04L 9/0847
See application file for complete search history.

(56) References Cited

U.S. PATENT DOCUMENTS 7,076,061 B1 * 7/2006 Lenstra ................. H04L 9/3013
380/28
2005/0213758 A1 * 9/2005 Lenstra ................. H04L 9/3013
380/44
(Continued)

FOREIGN PATENT DOCUMENTS

JP    2006-309068 A    11/2006
JP    2009-080344 A    4/2009
(Continued)

OTHER PUBLICATIONS

Japanese Office Action dated Jul. 16, 2019 for corresponding Japanese Patent Application No. 2016-006688, with English Translation, 8 pages.
(Continued)

*Primary Examiner* — Mahfuzur Rahman
(74) *Attorney, Agent, or Firm* — Fujitsu Patent Center

(57) ABSTRACT

An information processing terminal generates a shared key by a public key cryptosystem using an identifier. The information processing terminal calculates a first calculation value by using an algorithm that outputs an element on an extension field of a prime field from two points on an additive cyclic group on an elliptic curve that is defined by the prime field. The information processing terminal holds the first calculation value. The information processing terminal calculates a second calculation value from a variable using an identifier of a sharer that shares the shared key, a private key of the information processing terminal, and the algorithm. The information processing terminal generates the shared key by executing a final exponentiation to each of the exponentiation of the first calculation value and the second calculation value.

4 Claims, 11 Drawing Sheets

(51) Int. Cl.
   *H04L 9/14*   (2006.01)
   *H04L 9/30*   (2006.01)

(56) References Cited

U.S. PATENT DOCUMENTS

| | | |
|---|---|---|
| 2009/0083351 A1 | 3/2009 | Yonemura |
| 2010/0063986 A1 | 3/2010 | Yonemura et al. |
| 2012/0045051 A1 | 2/2012 | Nogami et al. |
| 2016/0112069 A1* | 4/2016 | Lablans ................ H03M 13/15 714/752 |
| 2017/0169735 A1* | 6/2017 | Lablans .................. G09C 1/00 |

FOREIGN PATENT DOCUMENTS

| | | |
|---|---|---|
| JP | 2010-066510 A | 3/2010 |
| JP | 2011-147060 A | 7/2011 |
| WO | 2010/123151 A2 | 10/2010 |

OTHER PUBLICATIONS

Ohgishi, Kiyoshi et al., "Notes on ID-based Key Sharing Systems Over Elliptic Curve", Technical Report of The Institute of Electronics, Information and Communication Engineers, ISEC, 1999, vol. 99, No. 414, pp. 37-42, see JPOA filed herewith and English Abstract.

\* cited by examiner $P, Q, x, z' = f(R, S), z_1' = z'^{2^{64}}, z_2' = z'^{2^{128}}, z_4' = z'^{2^{192}}$

FIG.11

| COMMON CURVE | | SQUARE MULTIPLICATION | MULTIPLICATION |
|---|---|---|---|
| CONVENTIONAL TECHNIQUE | POWER CALCULATION | (BIT NUMBER OF x)-1 | HW(x) |
| | MILLER ALGORITHM | (BIT NUMBER OF $\alpha$)-1 | HW($\alpha$) |
| | TOTAL | (BIT NUMBER OF x)+ (BIT NUMBER OF $\alpha$)-2 | HW(x)+HW($\alpha$) |
| PRESENT EMBODIMENT | | (BIT NUMBER OF $\alpha$)-1 | HW(x)+HW($\alpha$) |
| BN CURVE (256 bits) | | SQUARE MULTIPLICATION | MULTIPLICATION |
| CONVENTIONAL TECHNIQUE | POWER CALCULATION | 255 | 128 (AVERAGELY) |
| | MILLER ALGORITHM | 63 | 65 |
| | TOTAL | 318 | 193 |
| PRESENT EMBODIMENT | | 63 | 193 | the reference numeral.

COMPUTER-READABLE RECORDING MEDIUM, SHARED KEY GENERATION METHOD, AND INFORMATION PROCESSING TERMINAL

CROSS-REFERENCE TO RELATED APPLICATION

This application is based upon and claims the benefit of priority of the prior Japanese Patent Application No. 2016-006688, filed on Jan. 15, 2016, the entire contents of which are incorporated herein by reference.

FIELD

The embodiments discussed herein are related to a computer-readable recording medium, a shared key generation method, and an information processing terminal.

BACKGROUND

With the development and popularization of a technique concerned with a calculator and a network, an opportunity, in which important data is exchanged via a wireless communication network, an internet, etc., increases. Because tapping, fabricating, or spoofing on a communication path is comparatively easy in a wireless communication network and an internet, the demand for authentication of a communication partner and a cryptographic communication technique that protects a communication content on the basis of the authentication increases in order to maintain security. A widely used cryptographic communication technique includes a Transport Layer Security (TLS) to which various public key cryptographic techniques are applied.

As one example of such a public key cryptographic technique, there is known a cryptographic technique (hereinafter, may be referred to as "identity-based cryptographic technique" or "ID-based cryptographic technique") based on an identifier. In the identity-based cryptographic technique, it is sufficient that a public key thereof is an arbitrary identifier (ID), and thus a certificate is not needed. As an identifier, anything can be used, far example, an Internet Protocol address (IP address), a host name, a device number, a telephone number, a name decided according to an application, etc.

In a public key cryptographic technique such as RSA, a public key is some kind of number that is mathematically made regardless of an identifier, and thus a certificate is often used in order to associate a public key with an identifier that can be recognized by a user. On the other hand, in an identity-based cryptographic technique, an identifier is a public key, and thus, if an identifier of a communication target is given, cryptography processing can be executed without a certificate. Recently, a key sharing process (hereinafter, may be referred to as "MB method") in a key sharing protocol by McCullagh-Barreto is used as a key sharing protocol between two people with a mutual authentication function by ID.

Patent Literature 1: Japanese Laid-open Patent Publication No. 2006-309068

Patent Literature 2: Japanese Laid-open Patent Publication No. 2009-080344

Patent Literature 3: Japanese Laid-open Patent Publication No. 2010-066510

However, the calculation cost of a key sharing process using the MB method is large, and thus a processing delay may occur. In an Internet of Things system (IoT system) that includes a device whose gateway, sensor, or the like is low-performance, a processing delay is more likely to occur because of its calculation cost.

For example, in a process of key sharing between two people in the MB method, an exponentiation is executed, and then a bilinear map (hereinafter, may be referred to as "pairing function"; on an elliptic curve is executed. However, respective calculations are executed by using a multiplication or a squaring, and thus the calculation cost is large. When a presently-greatly-used Barreto-Naehrig curve (BN curve) (256 bits) is used, in the case of a Miller algorithm and a final exponentiation in the pairing function, the executed count of the squaring is 318 and that of the multiplication is 193 in total, and thus the calculation cost is large.

SUMMARY

According to an aspect of an embodiment, a non-transitory computer-readable recording medium stores therein a shared key generation program that causes an information processing terminal to execute a process. The process includes calculating a first calculation value by using an algorithm that outputs an element on an extension field of a prime field from two points on an additive cyclic group on an elliptic curve that is defined by the prime field; holding the first calculation value; calculating a second calculation value from a variable using an identifier of a sharer that shares the shared key, a private key of the information processing terminal, and the algorithm; and generating the shared key by executing a final exponentiation to each of an exponentiation of the first calculation value and the second calculation value.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 11 is a diagram illustrating effects; and

DESCRIPTION OF EMBODIMENTS

Preferred embodiments of the present invention will be explained with reference to accompanying drawings. In addition, the disclosed technology is not limited to the embodiments described below. Moreover, respective embodiments may be combined within a consistent range.

[a] First Embodiment

Overall Configuration

Figure 1:
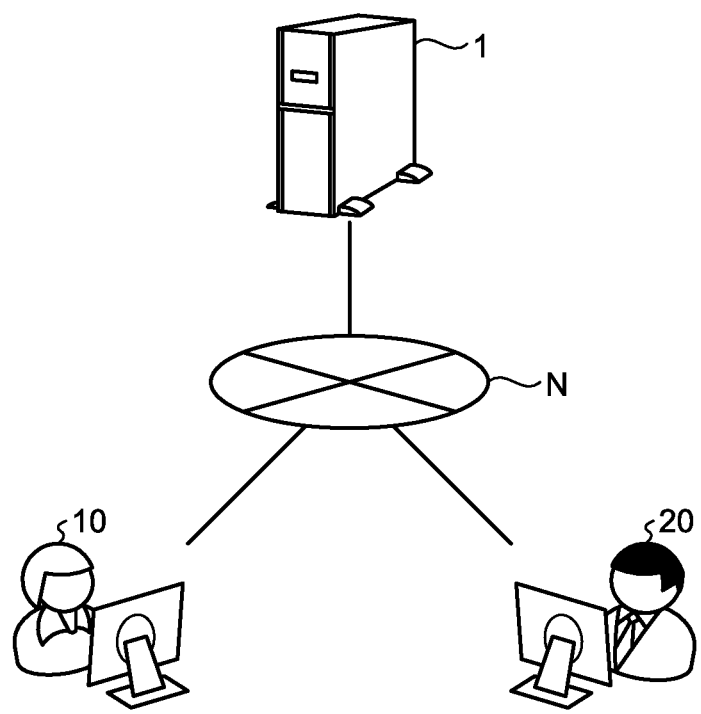
FIG. 1 is a diagram illustrating an example of an overall configuration of a system according to an embodiment.

FIG. 1 is a diagram illustrating an example of an overall configuration of a system according to an embodiment. As illustrated in FIG. 1, this system, in which a server 1, an information processing terminal 10, and an information processing terminal 20 are connected via a network N, executes an identity-based cryptographic technique, to which a key sharing using the MB method is adopted, between the information processing terminals 10 and 20. An arbitrary kind of communication network such as an internet, a Local Area Network (LAN), a Virtual Private Network (VPN) may be adopted, regardless of wired or wireless, as the network N.

The server 1 is a private key generator (PKG), and delivers a private key to the respective information processing terminals 10 and 20. The information processing terminal 10 is a computer that is used by a user A (hereinafter, may be referred to as subject A), and the information processing terminal 20 is a computer that is used by a user B (hereinafter, may be referred to as subject B). A server, a personal computer, a cell-phone, a smartphone, etc. may be adopted as the each of the information processing terminals.

Explanation of MB Method

A common key sharing method using the MB method will be explained. First, symbols will be defined. Let "p" be a characteristic, an additive cyclic group on an elliptic curve that is defined by a prime field "$F_p$" is described as "$E(F_p)$", the largest prime number by which an order "$\#E(F_p)$" of "$E(F_p)$" is divisible is "r", "k" that satisfies "$r|p^k-1$" is referred to as an embedding degree, and a partial additive group of an order "r" in "$E(F_p)$" is "$E(F_p)[r]$". In this case, a bilinear map "e" is defined as a function (for example, rational function) that outputs an element on an extension field for input of two elements of cyclic groups $G_1$ and $G_2$ that are defined hereinafter. Moreover, "e: $G_1 \times G_2 \rightarrow G_3$" may be sufficient. In the embodiments, "$Fp^k$" is similarly referred to as "p" raised to the power of "k" in "$F_p$".

$G_1: E(Fp)[r]$ $G_2: E(Fp^k)[r]$ $G_3: Fp^{k*}/(Fp^{k*})r$ $E: G_2 \times G_2 \rightarrow G_3$ Let a group constituted of integers 0 to (r−1) be referred to as "Zr". Then, for an element of cyclic groups $G_1$ and $G_2$, in a case of $\alpha \in Zr$, $P \in G_1$ (or $G_2$), a scalar multiplication "$\alpha P$" is defined as a calculation in which "$\alpha$"-sets of "P" are added up. Moreover, for an element of $G_3$, in a case of $\alpha \in Zr$, $x \in G_3$, an exponentiation $x^\alpha$ is defined as a calculation in which "$\alpha$"-sets of "P" are multiplied. In this case, the bilinearity is a property in which "$e(xP, Q)=e(P, xQ)=e(P, Q)^x$" is satisfied.

Next, a key exchange will be specifically explained. The private key generator (PKG) decides a master private key "$s \in Z_r$", and holds it privately. The PKG decides public parameters "$P \in G_1$, $Q \in G_2$, e, H, and $P_0=sP \in G_1$", and makes them open. "P" is a generator of the cyclic group $G_1$, "Q" is a generator of the cyclic group $G_2$, "e" is a bilinear map (hereinafter, may be referred to as "pairing function"), and "H" is a hash function by which an integer is acquired from an identifier. When "$a=H(ID_A)$", a public key $P_A$ corresponding to an identifier $ID_A$ of the subject A is "$P_A=aP+P_0=(a+s)P$", and thus anyone can calculate it from the public parameter. A private key $S_A$ corresponding to the identifier $ID_A$ is "$S_A=(a+s)^{-1}Q$", and thus only the PKG that knows a master private key "s" can calculate it.

Next, the PKG notifies a correct subject of the generated private key, which has a right to receive an authentication with a corresponding identifier. A key exchange between the subjects A and B is executed as follows on the premise that each one of them previously knows an identifier of the other. The subject A selects an integer "x" at random, and calculates "$R_A=xP_B$" to send it to the subject B. Similarly, the subject B selects an integer "y" at random to calculate "$R_B=yP_A$", and sends it to the subject A. Respective "$R_A$" and "$R_B$" are key materials that can be exclusively used by the subject B and the subject A. The subject B that receives "$R_A$" calculates "$Z_B=e(P,Q)^y e(R_A, S_B)$". On the other hand, the subject A that receives "$R_B$" calculates "$Z_A=e(P,Q)^x e(R_B, S_A)$". If the respective subjects A and B are correct subjects that have the private keys $S_A$ and $S_B$, and the key materials are not tampered in the process, "$Z_A=Z_B=e(P,Q)^{x+y}$" is satisfied by the bilinearity of pairing, and the key exchange, in which a shared key is "$Z_A=Z_B$", is completed.

Figure 2:
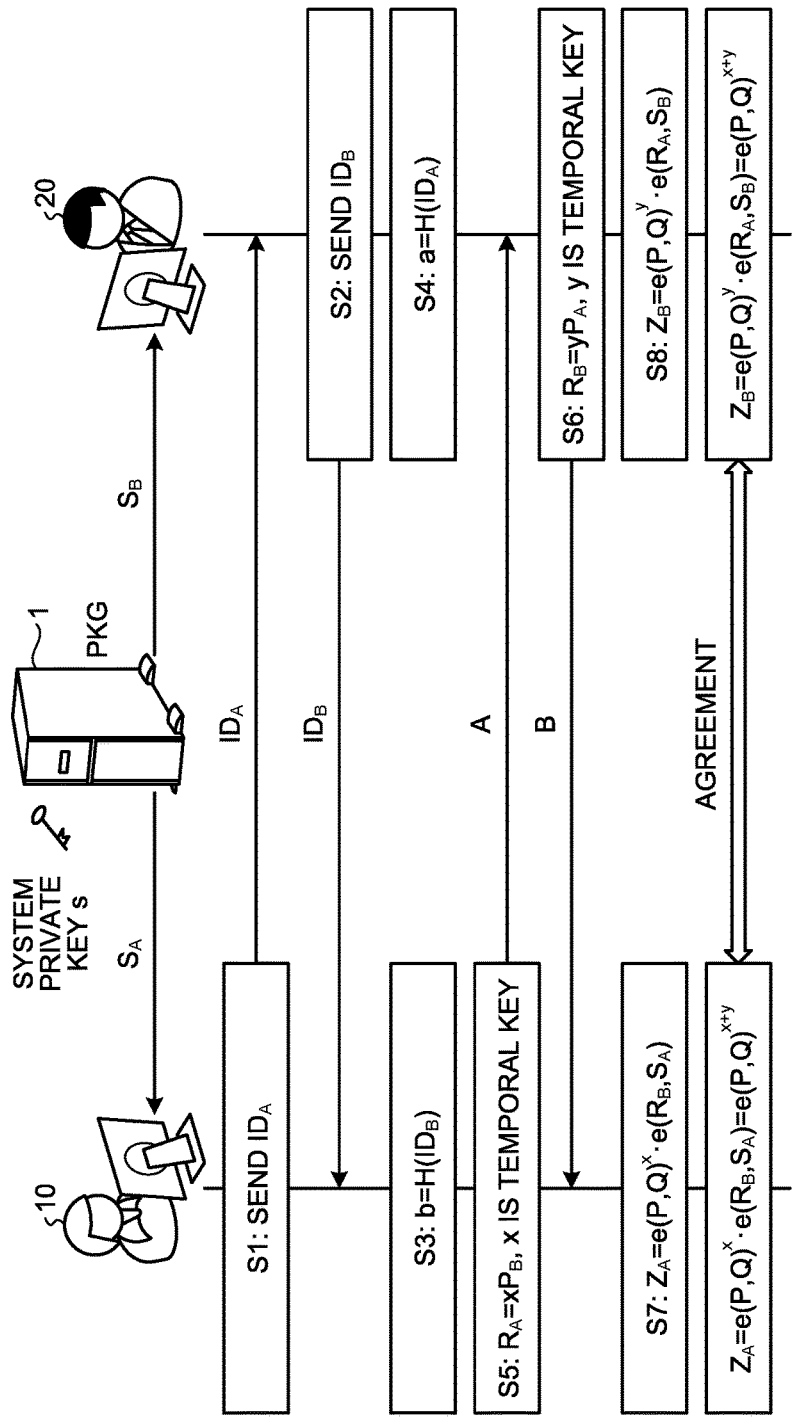
FIG. 2 is a diagram illustrating key sharing with identity-based authentication.

A procedure for the aforementioned process will be explained. FIG. 2 is a diagram illustrating a key sharing with identity-based authentication. It is assumed that a private key of the subject A (information processing terminal 10) is "$S_A(a+s)^{-1}Q$", and a private key of the subject B (information processing terminal 20) is "$S_B=(b+s)^{-1}Q$".

As illustrated in FIG. 2, the subject A sends the identifier $ID_A$ to the subject B (Step S1) and the subject B sends the identifier $ID_B$ to the subject A (Step S2), and thus identifiers are mutually exchanged.

Next, the subject A calculates "$b=H(ID_B)$" that is the material of a public key of the subject B (Step S3), and, similarly, the subject B calculates "$a=H(ID_A)$" that is the material of a public key oil the subject A (Step S4). Subsequently, the subject A calculates "$R_A=xP_S$ (x is temporal key)", and sends it to the subject B (Step S5). Similarly, the subject B calculates "$R_B=yP_A$ (y is temporal Key)", and sends it to the subject A (Step S6).

The subject A calculates "$Z_A=e(P,Q)^x xe (R_B, S_A)$" using the public key "$P_A=aP+P_0=(a+s)P$" of the subject A, "$R_B=yP_A$", and "$S_A=(a+s)^{-1}Q$" (Step S7). Similarly, the subject B calculates "$Z_B=e(P,Q)^y xe(R_A, S_B)$" using the public key "$P_B=bP+P_0(b+s)P$" of the subject B, "$R_A=xP_B$", and "$S_B=(b+s)^{-1}Q$" (Step S8). As a result, a key exchange in which a shared key is "$Z_A=Z_B$" is completed in the subjects A and B.

As described above, in the key sharing process in the MB method, the key can be calculated by "$c=z^x \times e(R,S)$". The "e" is a pairing function (bilinear map on elliptic curve), "z" is the result (e(P,Q)) of preliminary calculation of a pairing, "x" is an integer ($x \in Z_r$), and "P" and "Q" are elements of an additive group on an elliptic curve. In general, a shared key is calculated by calculating "$c_0=z^x$", "$c_1=e(R,S)$", and "$c=c_0 \times c_1$" in this order.

The pairing is executed two times in order to generate the shared key. "P" and "Q" are previously acquired, and thus the calculation of "e(P,Q)" can be preliminarily executed. Therefore, when a key sharing is executed in the subject A, an exponentiation is executed to acquire "$e(P,Q)^x$", subsequently, a pairing is executed to acquire "$e(R_B, S_A)$", and then the results of these are multiplied to realize the key sharing. Next, a conventional exponentiation and pairing will be specifically explained.

Exponentiation

Next, a common power calculation will be explained with reference to the information processing terminal 10. In a cryptosystem based on the pairing, an order "r" that is 256 bits or more is used in order to ensure enough safety. Therefore, for example, when an exponentiation "$a^x$" ($a \in G_3, x \in Z_r$)" is calculated, if "x" is selected from "$Z_r$" at random, "x" becomes nearly equal to "r" with high probability. Therefore, if the exponentiation is to be simply executed, $2^{256}$-sets of "a" are multiplied, and thus it is not realistic. Thereby, a binary method is often used as a method by which a power calculation is efficiently calculated (see FIG. 3).

Figure 3:
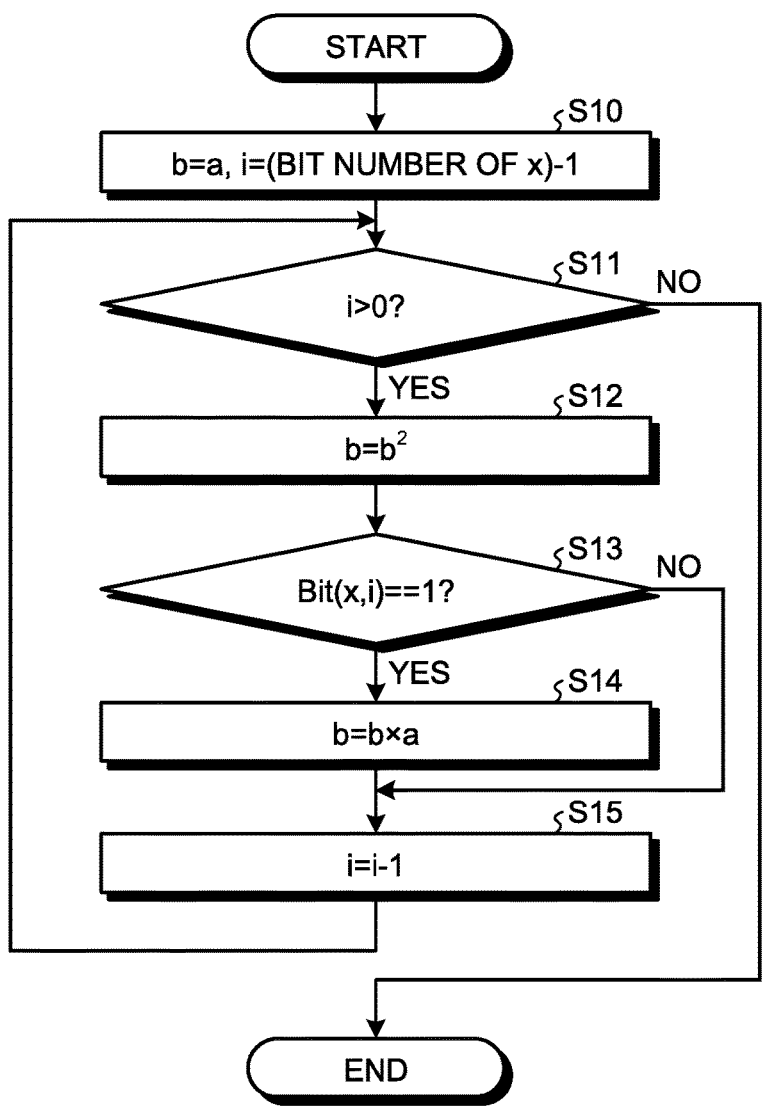
FIG. 3 is a flowchart illustrating a power calculation.

FIG. 3 is a flowchart illustrating a power calculation. As illustrated in FIG. 3, the information processing terminal 10 substitutes the variable "a" for "b" that is to be finally calculated, and further substitutes (|x|−1) for "i" (Step S10).

Next, when "i" is larger than "0" (Step S11: Yes), the information processing terminal 10 sets "$b=b^2$" (Step S12), and determines whether or not Bit(x,i) is "1" (Step S13). When Bit(x,i) is "1" (Step S13: Yes), the information processing terminal 10 executes "b=b×a" (Step S14), subtracts "1" from "i" (Step S15), and then repeats the steps after Step S11. Bit (x,i) is the "i"-th bit value from the least significant bit of "x".

On the other hand, when Bit(x,i) is not "1" (Step S13: No), the information processing terminal 10 executes the steps after Step S15. When "i" is "0" or less in Step S11 (Step S11: No), the information processing terminal 10 terminates the process.

When explained with a specific example, the algorithm will be explained, as a simple example, with reference to a calculation of raising "a" to the power of "x=10". First, as an initialization, "a" is substituted for the variable "b" by which a final result is acquired, and the index (|x|−1), namely "3", is substituted for the repeat count "i". The repetitive process is executed on the basis of "i". Presently, "i" is "3", and thus the squaring ($b=a^2$) is executed for "b". The "i"-th bit value from the least significant bit of "x" is checked. When it is "0", "1", is subtracted from "i", and the next repetitive process is to be executed. When it is "1", "b" is raised to the power of "a". Presently, the "i=3"-rd bit is "0", and thus the next repetitive process is to be executed.

Next, because "i=2", "$b=b^2=a^4$" is calculated. When the "i=2"-nd bit value is checked, it is "1", and thus "$b=b \times a=a^5$" is calculated, "1" is subtracted from "i", and the next repetitive process is to be executed. Next, because "i=1", "$b=b^2=a^{10}$" is calculated. When the "i=1"-st bit value is checked, it is "0", "1" is subtracted from "i", and the next repetitive process is to be executed. Next, because "i=0", and "i>0" is not satisfied, the calculation is terminated. In this case, it is found, from "$b=a^{10}$", that the correct calculation is executed. In this way, in a naive method, 9 multiplications are executed for "a". However, in a binary method, the calculation can be efficiently executed by 4 multiplications in total, specifically, 3 squarings and 1 multiplication. Hamming weight of "x" is the number of "1" in a case where "x" is expanded into a binary number.

Pairing Calculation

Figure 4:
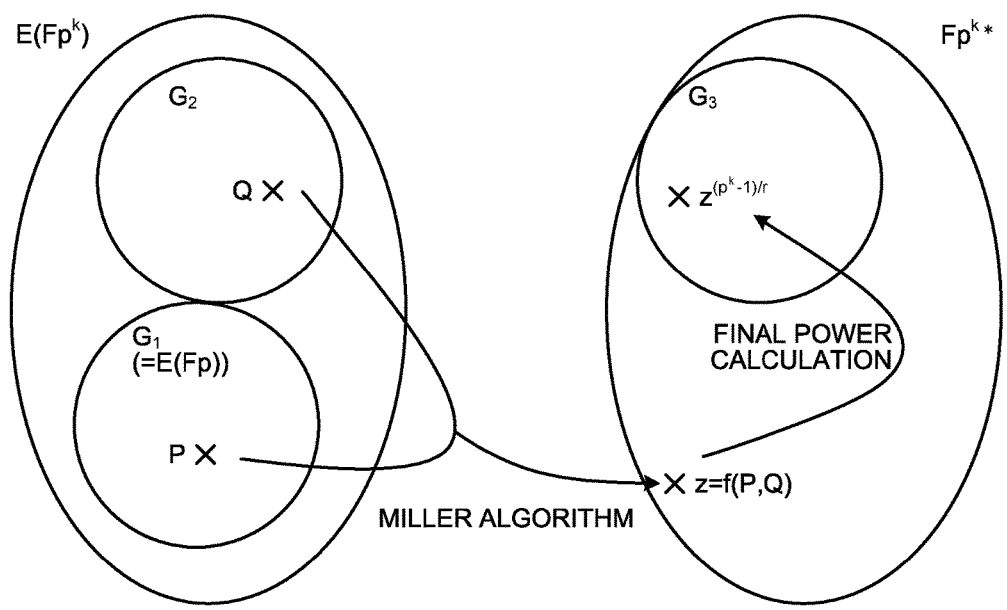
FIG. 4 is a diagram illustrating a pairing calculation.
Figure 5:
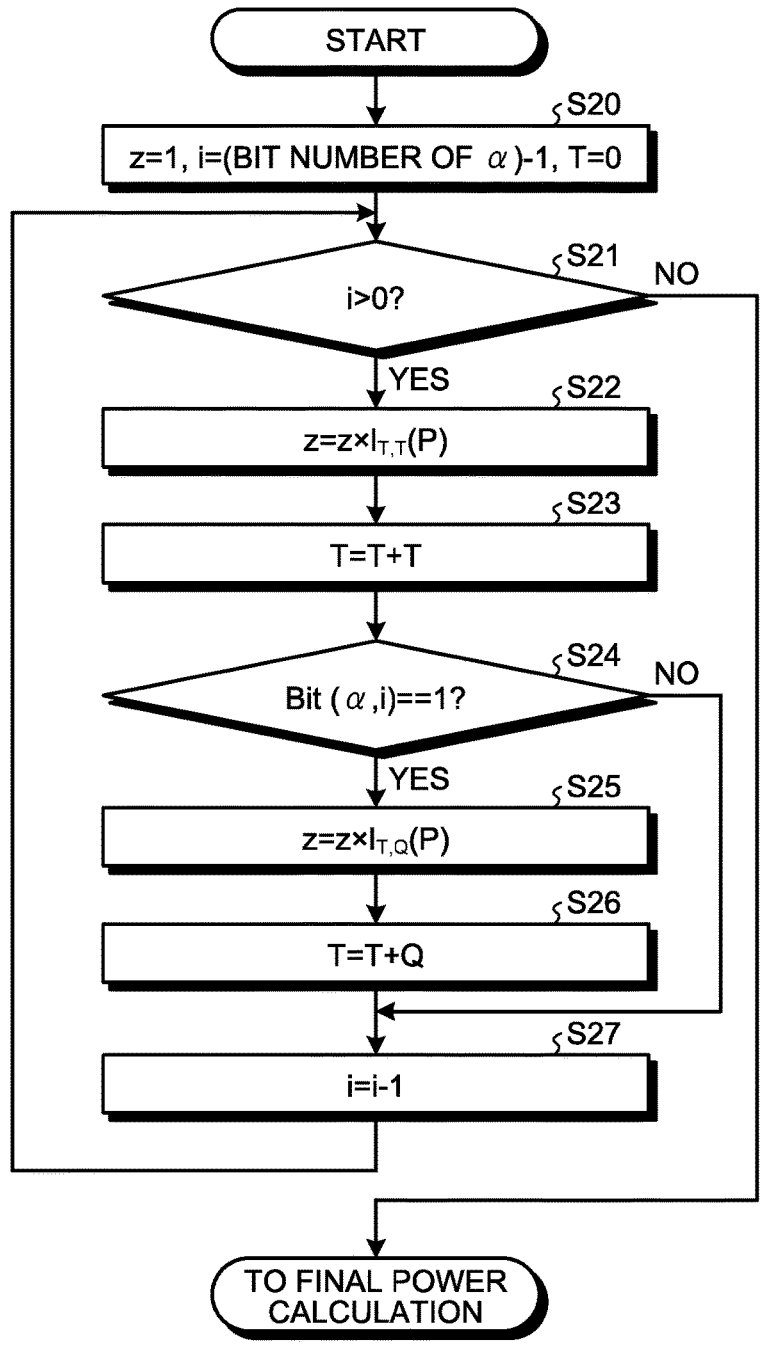
FIG. 5 is a flowchart illustrating a Miller algorithm.

Next, a pairing calculation will be explained with reference to FIGS. 4 and 5. FIG. 4 is a diagram illustrating a pairing calculation. FIG. 5 is a flowchart illustrating a Miller algorithm.

As illustrated in FIG. 4, in a pairing process, an element of an extension field is output for the input of two points on the elliptic curve. Specifically, for the input of the point "P" of the group $G_1$ on the prime field (E(Fp$^k$)) and the point "Q" of the group $G_2$ on the prime field (E(Fp$^k$)), these points "P" and "Q" are represented by points on the extension field in which "Fp" is made k-dimensional by the Miller algorithm, and then the final exponentiation is executed to generate a point of group $G_3$ on the extension field.

In other words, the pairing calculation is roughly divided into 2 steps of process. One is a calculation referred to as "Miller algorithm", and the other is a calculation referred to as "final power". When calculating the aforementioned pairing "e(P,Q)", the Miller algorithm is defined as a function "f" that outputs an element on the extension field "Fpk" from "P" and "Q". In the final exponentiation, the exponentiation for the element on the extension field acquired in the Miller algorithm by "$(p^k-1)/r$" is executed, and thus an element on $G_3$ can be acquired. A pairing "e" is expressed by a formula (1) by using a Miller algorithm "f".

$$e(P, Q) = f(P, Q) \frac{(p^k - 1)}{r} \quad (1)$$

The calculation of the Miller algorithm will be explained. As illustrated in FIG. 5, the information processing terminal 10 executes the initialization for the input of "P" and "Q" (Step S20). Specifically, the information processing terminal 10 substitutes "1" for a final output value "z" substitutes a value in which "1" is subtracted from the bit number of a previously determined repeat count "α" for the variable "i", and substitutes "Q" for "T".

Next, when "i" is larger than "0" (Step S21: Yes), the information processing terminal 10 calculates "z" (Step S22), substitutes "T+T" for "T" (Step S23), and determines whether or not "Bit(α,i)" is "1" (Step S24). "Bit (α, i)" represents the "i"-th bit value of "α". The "$l_{T,T}(P)$" in a formula executed in Step S22 indicates substitution of "P" into a tangent formula that passes through "T".

When "Bit(α,i)" is "1" (Step S24: Yes), the information processing terminal 10 calculates "z" (Step S25), substitutes "T+Q" for "T" (Step S26), subtracts "1" from "i" (Step S27), and then repeats the steps after Step S21. The "$l_{T,Q}(P)$" in a formula executed in Step S25 indicates substitution of "P" into a formula of a straight line that passes through "T" and "Q".

On the other hand, when "Bit(α,i)" is not "1" (Step S24: No), the information processing terminal 10 executes the steps after Step S27. When "i" is "0" or less in Step S21 (Step S21; No), the information processing terminal 10 terminates the process.

As described above, in the repetitive process of the calculation of both the exponentiation and the Miller algorithm, the squaring for an element on the extension field is executed. The result of the exponentiation and that of the Miller algorithm are finally multiplied, and thus the squaring executed by the 2 algorithms is reduced to realize the reduction of the calculation cost according to the generation of key sharing.

Hereinafter, an embodiment, in which the count of squaring is reduced to reduce the calculation cost in the calculation according to the generation of key sharing, will be explained. The process executed by the information processing terminal 10 and that by the information processing terminal 20 is similar to each other, and thus the information processing terminal 10 is exemplified to explain.

Functional Configuration

Figures 6, 7:
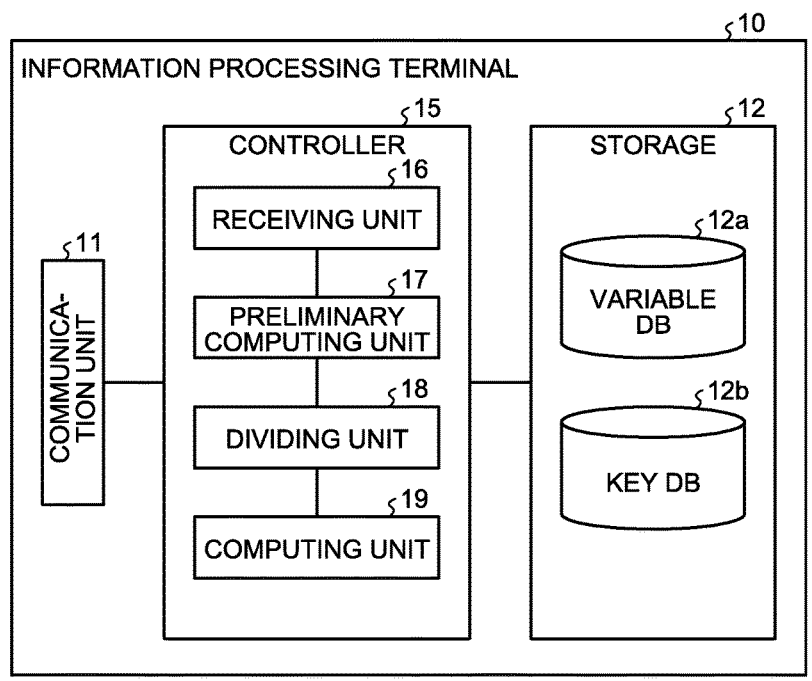
FIG. 6 is a functional block diagram illustrating a functional configuration of an information processing terminal.
FIG. 7 is a diagram illustrating an example of information stored in a variable database (variable DB)

FIG. 6 is a functional block diagram illustrating a functional configuration of the information processing terminal 10. As illustrated in FIG. 6, the information processing terminal 10 includes a communication unit 11, a storage 12, and a controller 15.

The communication unit 11 is a processing unit such as a network interface card, which controls communication of other devices. For example, the communication unit 11 receives a private key from the server 1, sends the identifier ($ID_A$) and the like to the information processing terminal 20, and receives the identifier ($ID_B$) and the like from the information processing terminal 20.

The storage 12 is one example of a memory device such as a memory or a hard disk, and stores a program, data, etc. The storage 12 stores a variable DB 12a and a key DB 12b. The variable DB 12a is a database that stores various kinds of information used when generating the key sharing using the MB method. FIG. 7 is a diagram illustrating an example of information stored in the variable database (variable DB) 12a. As illustrated in FIG. 7, the variable DB 12a stores "R, S, x, z'=f(P,Q), $z_1$', $z_2$', $z_3$'" that can be preliminarily calculated. The key DB 12b is a database that stores a shared key generated between the information processing terminals 10 and 20.

The controller 15 is a processing unit such as a processor, which manages processing of whole of the information processing terminal 10. The controller 15 includes a receiving unit 16, a preliminary computing unit 17, a dividing unit 18, and a computing unit 19. The receiving unit 16, the preliminary computing unit 17, the dividing unit 18, and the computing unit 19 are one example of electronic circuitry included in a processor or that of a process that is executed by a processor.

The receiving unit 16 is a processing unit that receives various information from another terminal. For example, the receiving unit 16 receives the private key $S_A$ (for example, $S_A=(a+s)^{-1}Q$) from the server 1, and stores it in the variable DB 12a. The receiving unit 16 receives the aforementioned identifier "$ID_B$" and "$R_B$", etc. from the information processing terminal 20, and stores them in the variable DB 12a.

The preliminary computing unit 17 is a processing unit that calculates various information (for example, numerical value) that can be preliminarily calculated with regard to the exponentiation and the calculation of the Miller algorithm in execution of the key sharing, and stores it in the variable DB 12a. Specifically, the preliminary computing unit 17 calculates, not the pairing "e(P,Q)", but "f(P,Q)", in which a function of the Miller algorithm is used, prior to the key sharing process, and stores it in the variable DB 12a.

In other words, because the preliminary computing unit 17 preliminarily calculates "f(P,Q)" and the result of the pairing is an element that is a base of the exponentiation, the final exponentiation of "e(P,Q)" can be simultaneously executed when the final exponentiation of "e(R,S)" is executed, by utilizing the execution of the final exponentiation. In other words, if the calculation is executed as a formula (2), it is sufficient that the count of the final exponentiation is "1", when the final exponentiation of "e(P,Q)" is postponed, the calculation cost is reduced.

$$e(P, Q)^x e(R, S) = \{f(P, Q)^x f(R, S)\}^{\frac{(p^k-1)}{r}} \quad (2)$$

The dividing unit 18 is a processing unit that divides the repeat count of the exponentiation in accordance with that of the Miller algorithm, and further calculates the respective squarings in the divided exponentiation at the count of "1" by utilizing the preliminary calculation. The dividing process may be omitted. However, the execution of the dividing process can more reduce the calculation cost.

Figure 8:
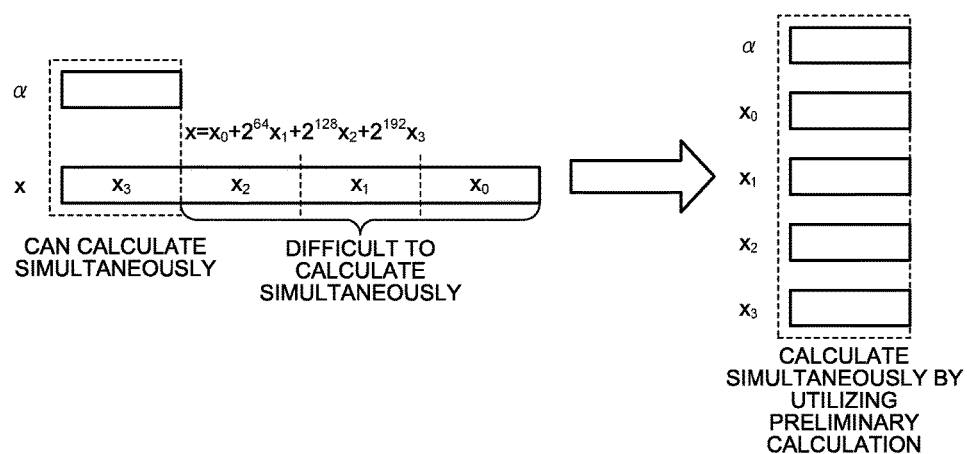
FIG. 8 is a diagram illustrating a dividing process.

FIG. 8 is a diagram illustrating the dividing process. As illustrated in FIG. 8, "α and $x_3$" can be calculated simultaneously. However, respective "α and $x_2$", "α and $x_1$", and "α and $x_0$" are not be executed simultaneously, and thus this part is to be repeated. Therefore, these are divided in accordance with "α" and calculated simultaneously by utilizing the preliminary calculation, and thus the repeat count is reduced.

For example, a method, in which the exponentiation is divided and the squaring is coordinated by using the preliminary calculation, will be explained. A case in which "r" is a BN curve of 256 bits will be here exemplified. In this case, "x" is 256 bits and "α" is 64 bits, and thus there exists the squarings that are not calculated simultaneously. Therefore, the dividing unit 18 expands, as a formula (3), "x" into base $2^{64}$ to divide it by 64 bits.

$$x = x_0 + 2^{64}x_1 + 2^{128}x_2 + 2^{192}x_3 \quad (3)$$

The dividing unit 18 deforms "$z^x$" by using the formula (3) to deform, the formula (2) into a formula (4).

$$\begin{aligned}
z^x &= z^{x_0 + 2^{64}x_1 + 2^{128}x_2 + 2^{192}x_3} \\
&= (z^{x_0}) \cdot (z^{2^{64}})^{x_1} \cdot (z^{2^{128}})^{x_2} \cdot (z^{2^{192}})^{x_3} \\
&= (z^{x_0}) \cdot (z_1)^{x_1} \cdot (z_2)^{x_2} \cdot (z_3)^{x_3}
\end{aligned} \quad (4)$$

In other words, because the dividing unit 18 calculates the product of the exponentiation of "z", "$z_1$", "$z_2$", and "$z_3$", "$z_1$", "$z_2$", and "$z_3$" are preliminarily calculated and stored in the variable DB 12a. As a result, the counts of the squarings that are executed in these exponentiations can be coordinated to "1". Therefore, the counts of the squarings in these exponentiations and those of the squarings in the Miller algorithms can be coordinated to "1".

The computing unit 19 is a processing unit that executes, after calculating the exponentiation and the Miller algorithm, the final exponentiation using the preliminarily calculated "z'=f(P,Q)", "$z_1$'", "$z_2$'", and "$z_3$'" to generate the shared key. Specifically, the computing unit 19 executes the formula (2) to calculate "$e(P,Q)^x e(R,S)$". The computing unit 19 stores "$e(P,Q)^x e(R,S)$" in the key DB 12b.

Processing Procedure

Figure 9:
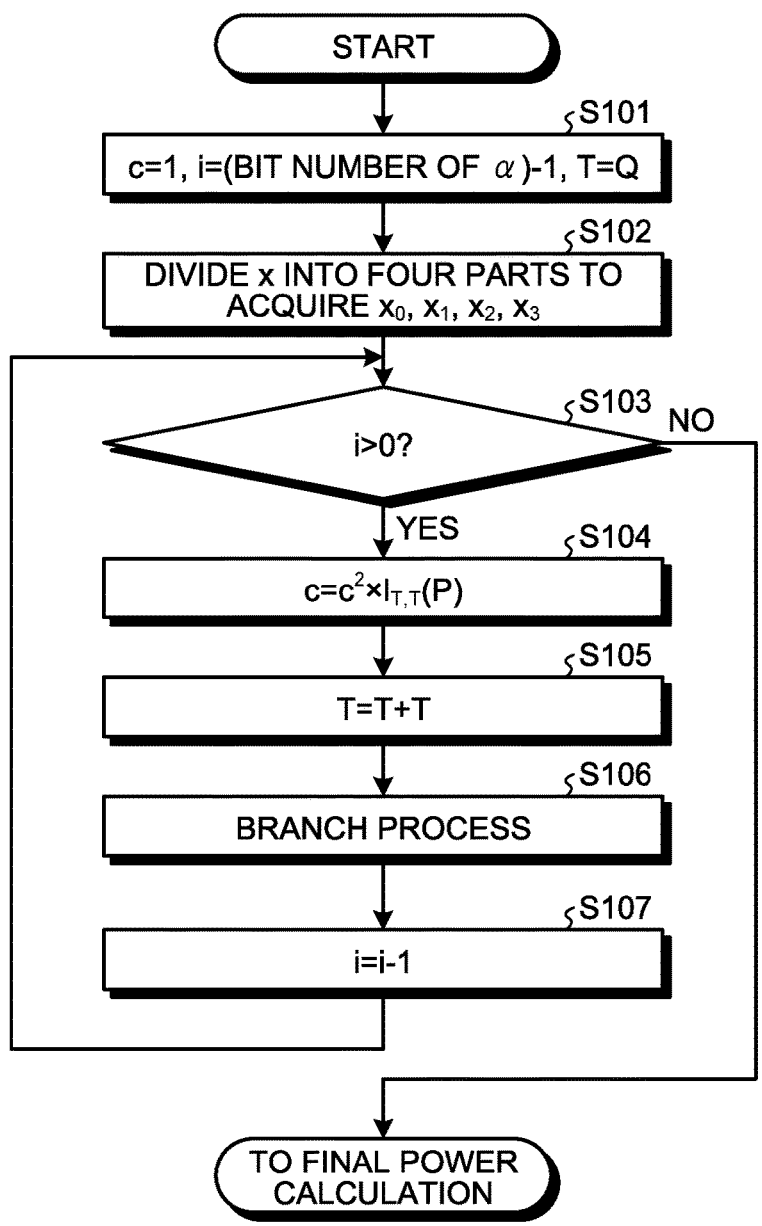
FIG. 9 is a flowchart illustrating a processing procedure.
Figure 10:
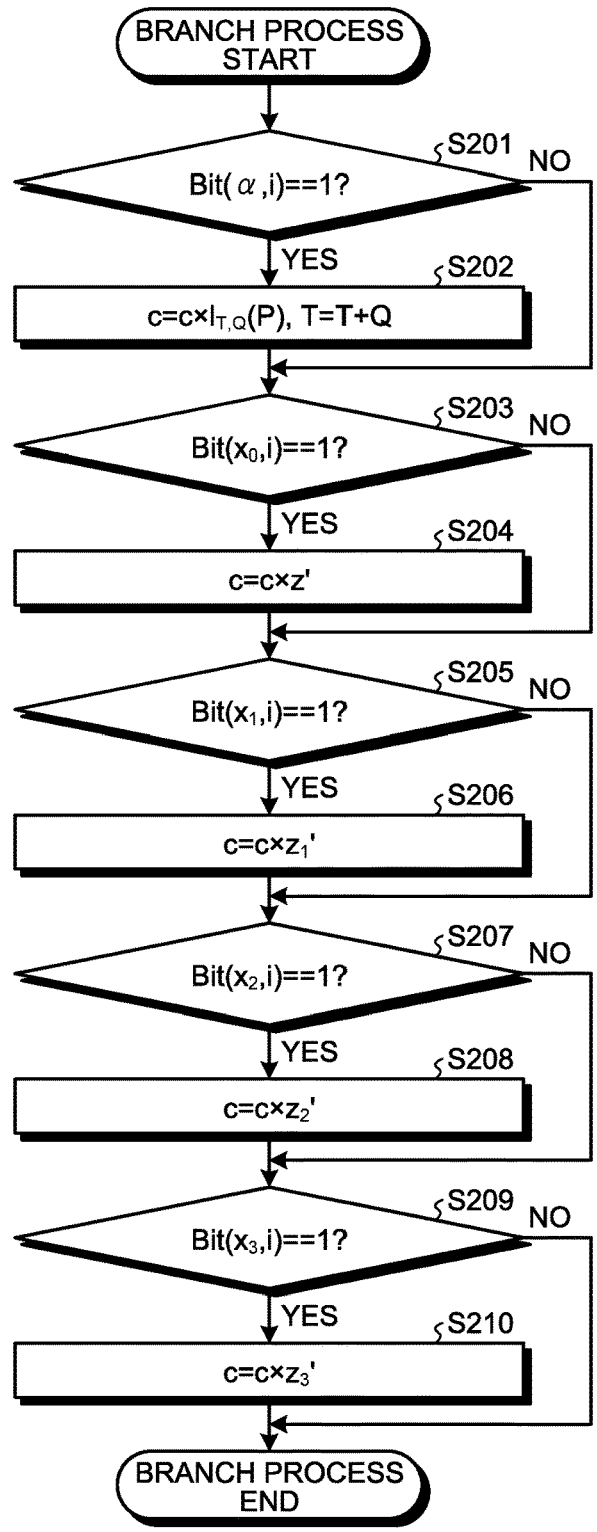
FIG. 10 is a flowchart illustrating a processing procedure for a branch process.

Next, the aforementioned preliminary calculation and dividing process will be explained with reference to flowcharts. FIG. 9 is a flowchart illustrating the processing procedure. FIG. 10 is a flowchart illustrating a processing procedure for a branch process. After the process illustrated in FIG. 8 is executed, the final exponentiation is executed.

As illustrated in FIG. 9, the information processing terminal 10 executes the initialization (Step S101). Specifically, the information processing terminal 10 substitutes "1" for "c" that is a target of the finally calculation, substitutes "α (previously determined repeat count) −1" for "i" that is to be determined repeatedly, and substitutes "Q" for "T".

Next, the information processing terminal 10 divides "x" into four parts to acquire "$x_0$", "$x_1$", "$x_2$", and "$x_3$" (Step S102). If "i" is larger than "0" (Step S103: Yes), the information processing terminal 10 calculates "$c = c^2 \times l_{T,T}$ "(P)" (Step S104), calculates "T=T+T" (Step S105), and then executes the branch process (Step S106).

After the branch process is executed, the information processing terminal 10 subtracts "1" from "i" (Step S107), and then the steps after Step S103 is repeated. When "i" is "0" or less in Step S103 (Step S103: No), the information processing terminal 10 terminates the process.

Next, the branch process in Step S106 will be explained. As illustrated in FIG. 10, when "Bit($\alpha$, i)" is "1" (Step S201: Yes), the information processing terminal 10 calculates "c=c×$l_{T,Q}$(P)", and substitutes "T+Q" for "T" (Step S202). On the other hand, when "Bit($\alpha$,i)" is not "1" (Step S201; No), the information processing terminal 10 executes Step S203 without executing Step S202.

When "Bit($x_0$, i)" is "1" (Step S203: Yes), the information processing terminal 10 calculates "c=c×z'" (Step S204). On the other hand, when "Bit($x_0$, i)" is not "1" (Step S203: No), the information processing terminal 10 executes Step S205 without executing Step S204.

Next, when "Bit($x_1$, i)" is "1" (Step S205: Yes), the information processing terminal 10 calculates "c=c×$z_1$'" (Step S206). On the other hand, when "Bit($x_1$, i)" is not "1" (Step S205: No), the information processing terminal 10 executes Step S207 without executing Step S206.

Next, when "Bit($x_2$, i)" is "1" (Step S207: Yes), the information processing terminal 10 calculates "c=c×$z_2$'" (Step S208). On the other hand, when "Bit($x_2$, i)" is not "1" (Step S207: No), the information processing terminal 10 executes Step S209 without executing Step S208.

Next, when "Bit($x_3$,i)" is "1" (Step S209: Yes), the information processing terminal 10 calculates "c=c×$z_3$'" (Step S210), and then returns to the process illustrated in FIG. 8. On the other hand, when "Bit ($x_3$, i)" is not "1" (Step S209; No), the information processing terminal 10 returns to the process illustrated in FIG. 8 without executing Step S210.

Effects

As described above, the information processing terminal 10 executes the exponentiation for "z'", "$z_1$'", "$z_2$'", and "$z_3$'" and the squaring in the Miller algorithm by one count of the squaring of Step S104. In the branch process illustrated in FIG. 9, the information processing terminal 10 checks the bit value with regard to the respective indexes of each divided exponentiation and the repeat count of the Miller algorithm, and executes a process according to the bit value. As a result, the squaring can be reduced, and thus the calculation cost according to the encryption key sharing can be reduced.

FIG. 11 is a diagram illustrating effects. As illustrated in FIG. 11, in an ordinary curve of a conventional technique, "|x|−1" counts of the squarings in the exponentiation are executed, where |x| means the number of bits in x and "|$\alpha$|−1" counts of the squarings in the Miller algorithm are executed. Therefore, "|x|+|$\alpha$|−2" counts, in total, of the squarings are executed. However, by employing the aforementioned embodiment, the squaring of the exponentiation can be coordinated to the squaring in the Miller algorithm, and thus the count of the squarings becomes "|$\alpha$|−1" counts in total. As a result, by employing the aforementioned embodiment, "|x|−1" counts of the squarings can be reduced.

In a BN curve of 256 bits of a conventional technique, "255" counts of the squarings in the exponentiation are executed, and "63" counts of the squarings in the Miller algorithm are executed. Therefore, "255+63=318" counts of the squarings are executed in total. However, by employing: the aforementioned embodiment, the squaring of the exponentiation can be coordinated to the squaring in the Miller algorithm, and thus the count of the squaring becomes "63" counts in total. As a result, by employing the aforementioned embodiment, "255" counts of the squarings can be reduced.

[b] Second Embodiment

The embodiment according to this invention is explained so far. However, this invention may be embodied by various embodiments other than the aforementioned one.

Frobenius Map

The exponent of the exponentiation is expand into base "$2^w$", and thus the repeat count of the exponentiation and the repeat count of the Miller algorithm are accorded. In this case, for example, if the power index is 256 bits and the repeat count of the Miller algorithm is 64 bits, a formula (5) is to be held.

$$f(Q,P)^{2^{64}} f(Q,P)^{2^{128}} f(Q,P)^{2^{192}} \quad (5)$$

In the BN curve, the characteristic "p" is defined as "p=36$\alpha^4$−36$\alpha^3$+24$\alpha^2$−6$\alpha$+1", the order "r" is defined as "r=36$\alpha^4$−36$\alpha^3$+18$\alpha^2$−6$\alpha$+1", and the trace "t" is defined as "t=6$\alpha^2$+1". In this case, the calculation amount can be reduced while reducing the amount to be preliminarily held by using the Frobenius map that is defined as the map on the extension field. Specifically, in the Frobenius map, an element of $G_3$ has a feature that the exponentiation with exponent "p" can be calculated in this map, and thus can be realized at "1" count.

For example, when the Frobenius map is combined, "6$\alpha$=1+$\phi$+$\phi^3$+$\phi^{10}$" is established. From this, an exponentiation with exponent "6$\alpha$" can be calculated in the Frobenius map. Therefore, when the power index "x" is expanded, the preliminary calculation described in, for example, the first embodiment is not needed, and thus the memory amount in holding the values that are preliminarily calculated can foe reduces.

Specifically, "x" is expanded into base "p", and "x=$x_0$+p$x_1$" is acquired. Herein, "$x_0$ and $x_1$" are expanded into base "6$\alpha$", and "x=$x_{0,0}$+(6$\alpha$)$x_{0,1}$+p($x_{1,0}$+(6$\alpha$)$x_{1,1}$)=$x_{0,0}$+(1+$\phi$+$\phi^3$+$\phi^{10}$)$x_{0,1}$+p($x_{1,0}$+(1+$\phi$+$\phi^3$+$\phi^{10}$)$x_{1,1}$)=$x_{0,0}$+(1+$\phi^3$) (1+$\phi^{10}$) $x_{0,1}$+$\phi x_{1,0}$+$\phi$(1+$\phi^3$)(1+$\phi^{10}$)$x_{1,1}$" can be acquired.

Therefore, the information processing terminal 10 calculates "z'=f(P,Q)", "$Z_1$'=$\phi^3$(z')·z'", "$z_1$'=$\phi^{10}$($z_1$')·$z_1$'", "$z_2$'=$\phi$(z')", and "$z_3$'=$\phi(z_1$')" before starting the exponentiation, and thus the memory amount can be reduced.

Special Pairing

In the aforementioned embodiment, the pairing process, in which the final exponentiation is executed after the Miller algorithm, is explained. However, not limited thereto, the aforementioned embodiment may be applied to another pairing process. For example, there exists a pairing process in which, depending on a used curve, an additional process is executed after the Miller algorithm, and then the final exponentiation is executed. Even in such a pairing process, when the value just before the execution of the final exponentiation is preliminarily calculated and held, the processing can be executed similarly.

For example, when explained with reference to Optimal Ate pairing using the BN curve, "e(P,Q)" can be calculated as in the formula (5). Within a formula (6), an underlined part is a part of an additional process that is different from that of the first embodiment. When the first embodiment is applied to the formula (6), a formula (7) is established. Therefore, even when an additional process exists, the squaring of the exponentiation can be coordinated to the squaring of the Miller algorithm, and thus the calculation cost can be reduced.

$$e(P, Q) = \qquad (6)$$

$$\left\{ f_{6\alpha+2,Q}(P) \times 1_{[6\alpha+2]Q,\varphi_{G_2}(Q)}(P) \times 1_{[6\alpha+2]Q+\varphi_{G_2}(Q),-\varphi_{G_2}^2(Q)}(P) \right\}^{\frac{p^{12}-1}{r}}$$

$$e(P, Q)^x e(S, R) = \left\{ F(6\alpha+2, Q, P, S, \qquad (7) \right.$$

$$\left. R) \times 1_{[6\alpha+2]Q,\varphi_{G_2}(Q)}(P) \times 1_{[6\alpha+2]Q+\varphi_{G_2}(Q),-\varphi_{G_2}^2(Q)}(P) \right\}^{\frac{p^{12}-1}{r}}$$

In the formula (7), "p" is the characteristic, "r" is the order of the groups "$G_1$", "$G_2$", and "$G_3$", which is used in the pairing, and $P \in G_1$, $Q \in G_2$, $z=e(P,Q) \in G_3$. Moreover, "t" is the trace in an elliptic curve cryptography, "$\alpha$" is a parameter that gives variables "p", "r", and "t". The "k" is an embedding degree, and is the smallest integer that is the result of divided ($p^k-1$) by "r". The "$\phi$" is the Frobenius map in "$Fp^k$", and "$\phi_{G2}$" is the Frobenius map in "$E(F_p^k)$". The "Q" and "$\phi_{G2}$" are defined as in a formula (8).

$$Q=(X_Q, Y_Q) \in E(F_{pk}), \phi_{G_2}(Q)=(\phi(X_Q), \phi(Y_Q)) \qquad (8)$$

Algorithm and Curve

In the aforementioned embodiment, the Miller the algorithm is exemplified to explain. However is not limited thereto. For example, any algorithm that executes bilinear mapping on an elliptic curve similarly to the Miller the algorithm can be adopted. Moreover, not limited to the BM curve, an ordinary curve can be adopted.

System

The components of the apparatuses illustrated in the drawings are merely conceptual, and need not be physically configured as illustrated. That is, specific forms of distribution and integration of the apparatuses are not limited to those illustrated in the drawings. Further, for each processing function performed by each apparatus, all or any part of the processing function may be implemented by a CPU and a program analyzed and executed by the CPU or may be implemented as hardware by wired logic.

Of the processes described in the embodiments, all or part of a process described as being performed automatically may be performed manually. Alternatively, all or part of a process described as being performed manually may also be performed automatically by known methods. In addition, the processing procedures, control procedures, specific names, and information including various kinds of data and parameters illustrated in the above-described document and drawings may be arbitrarily changed unless otherwise specified.

Hardware

Figure 12:
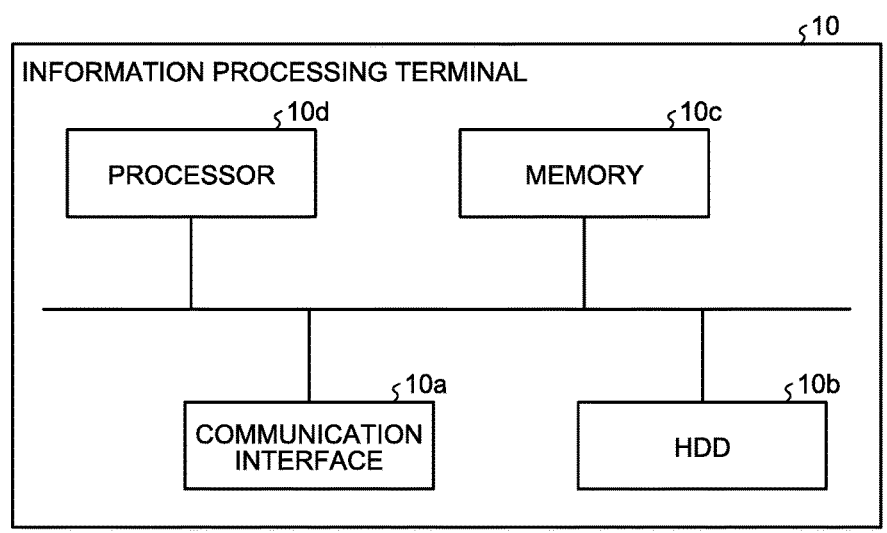
FIG. 12 is a diagram illustrating a configuration example of hardware.

FIG. 12 is a diagram illustrating a hardware configuration example. As illustrated in FIG. 12, the information processing terminal 10 includes a communication interface 10a, a hard disk drive (HDD) 10b, a memory 10c, and a processor 10d. Each of the units illustrated in FIG. 12 is connected to each other via a bus, etc.

The communication interface 10a is an interface, such as a network interface card, which controls communication with other apparatuses. The HDD 10b stores the programs, the databases, and the tables, which operate the functions having illustrated in FIG. 6 and the like.

The processor 10d reads, from the HDD 10b or the like, the program that executes the processing similar to that of each of the processing units illustrated in FIG. 6, etc., and expands it in the memory 10c to operate the process that executes each of the functions illustrated in FIG. 6, etc.

In other words, this process executes the function that is similar to each of the processing unit included in the information processing terminal 10. Specifically, the processor 10d reads a program, which has a function that is similar to that of the receiving unit 16, the preliminary computing unit 17, the dividing unit 18, the computing unit 19, etc., from the HDD 10b, etc. The processor 10d executes the process that executes the processing similar to that of the receiving unit 16, the preliminary computing unit 17, the dividing unit 18, and the computing unit 19.

In this way, the information processing terminal 10 reads and executes a program to operate as an information processing device that executes the shared key generation method. Moreover, the information processing terminal 10 may read the aforementioned program from a recording medium by a medium recording device, and may execute the read program to realize a function that is similar to that according to the aforementioned embodiment. Moreover, a program referred in other embodiments is not limited to be executed by the information processing terminal 10. For example, this invention may be similarly applied in such a case that another computer or server executes the program, or they cooperate to execute the program.

According to an aspect of the embodiments, a calculation cost of encryption key sharing can be reduced.

All examples and conditional language recited herein are intended for pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A non-transitory computer-readable recording medium having stored therein a shared key generation program that causes an information processing terminal to execute a process, the process comprising:
   calculating a first calculation value by using an algorithm that outputs an element on an extension field of a prime field from two points on an additive cyclic group on an elliptic curve that is defined by the prime field, the algorithm being a rational function that is calculated using a Miller algorithm;
   holding the first calculation value;
   calculating a second calculation value from a variable using an identifier of a sharer that shares the shared key, a private key of the information processing terminal, and the algorithm; and
   generating the shared key by executing a final exponentiation to each of an exponentiation of the first calculation value and the second calculation value to calculate a bilinear map of an exponentiation using the two points and a bilinear map using the variable using the identifier of the sharer and the private key of the information processing terminal, and generating a multiplication result of the bilinear maps as the shared key.

2. The non-transitory computer-readable recording medium according to claim 1, wherein
   the calculating includes dividing a repeat count of the exponentiation in accordance with a repeat count of the algorithm, the holding includes holding a result of each of divided parts of the exponentiation, and the generating includes executing a final exponentiation to each of the divided parts of the exponentiation and the second calculation value and generating the shared key.

3. A shared key generation method comprising:

calculating a first calculation value by using an algorithm that outputs an element on an extension field of a prime field from two points on an additive cyclic group on an elliptic curve that is defined by the prime field, the algorithm being a rational function that is calculated using a Miller algorithm, using a processor;

holding the first calculation value;

calculating a second calculation value from a variable using an identifier of a sharer that shares the shared key, a private key of an information processing terminal, and the algorithm, using the processor; and generating the shared key by executing a final exponentiation to each of an exponentiation of the first calculation value and the second calculation value to calculate a bilinear map of an exponentiation using the two points and a bilinear map using the variable using the identifier of the sharer and the private key of the information processing terminal, and generating a multiplication result of the bilinear maps as the shared key, using the processor.

4. An information processing terminal comprising:

a memory; and a processor that is connected to the memory, wherein the processor executes a process comprising:

calculating a first calculation value by using an algorithm that outputs an element on an extension field of a prime field from two points on an additive cyclic group on an elliptic curve that is defined by the prime field, the algorithm being a rational function that is calculated using a Miller algorithm;

holding the first calculation value to the memory;

calculating a second calculation value from a variable using an identifier of a sharer that shares the shared key, a private key of the information processing terminal, and the algorithm; and generating the shared key by executing a final exponentiation to each of an exponentiation of the first calculation value and the second calculation value to calculate a bilinear map of an exponentiation using the two points and a bilinear map using the variable using the identifier of the sharer and the private key of the information processing terminal, and generating a multiplication result of the bilinear maps as the shared key.

* * * * *